United States Patent
Woods (10) Patent No.: US 10,428,545 B2
(45) Date of Patent: Oct. 1, 2019

(54) POOL COVER SKIMMER ATTACHMENT

(71) Applicant: Teresa Woods, Brownsburg, IN (US)

(72) Inventor: Teresa Woods, Brownsburg, IN (US)

( * ) Notice: Subject to any disclaimer, the term of this patent is extended or adjusted under 35 U.S.C. 154(b) by 0 days.

(21) Appl. No.: 15/863,250

(22) Filed: Jan. 5, 2018

(65) Prior Publication Data

US 2018/0195302 A1    Jul. 12, 2018

Related U.S. Application Data

(60) Provisional application No. 62/444,539, filed on Jan. 10, 2017.

(51) Int. Cl.
| | |
|---|---|
| *E04H 4/10* | (2006.01) |
| *E04H 4/12* | (2006.01) |
| *C02F 1/40* | (2006.01) |
| *C02F 103/42* | (2006.01) |

(52) U.S. Cl.
CPC ............ *E04H 4/1263* (2013.01); *C02F 1/40* (2013.01); *E04H 4/101* (2013.01); *C02F 2103/42* (2013.01); *E04H 4/108* (2013.01)

(58) Field of Classification Search
CPC ........... E04H 4/10; E04H 4/101; E04H 4/108; E04H 4/1209; E04H 4/1263; B01D 21/2433; B01D 21/2438
USPC ........ 210/776, 167.1, 167.18, 167.19, 167.2, 210/242.1, 525, 527; 4/490, 496, 498, 4/502
See application file for complete search history.

(56) References Cited

U.S. PATENT DOCUMENTS

| | | | | |
|---|---|---|---|---|
| 1,918,742 A | * | 7/1933 | Elrod | B01D 21/18 210/525 |
| 3,184,764 A | * | 5/1965 | West | E04H 4/10 210/167.19 |
| 3,277,498 A | * | 10/1966 | Kleinbard | E04H 4/101 4/502 |
| 3,840,118 A | * | 10/1974 | Whitmore | E04H 4/06 210/167.19 |
| 3,982,286 A | * | 9/1976 | Foster | E04H 4/101 4/502 |
| 4,379,351 A | * | 4/1983 | Hinsperger | E04H 4/10 4/498 |
| 5,139,660 A | * | 8/1992 | Lourie | E04H 4/1609 4/490 |

(Continued)

*Primary Examiner* — Christopher Upton
(74) *Attorney, Agent, or Firm* — C. John Brannon; Brannon Sowers & Cracraft PC (57) ABSTRACT

Methods, systems, and apparatus for automatically skimming swimming pools with a pool cover attachment. In one aspect, an apparatus includes a skimming element holder; a skimming element connected to the skimming element holder; a base member connected between the swimming pool cover and the skimming element, where pivot of the base member pivots the skimming element holder and the skimming element; and a skimming guide connected to the base member, where the swimming pool cover defines a swimming pool plane; the base member automatically actuates the skimming element through the swimming pool plane, and immediately before ending the traversal along the swimming pool plane, the base member again automatically actuates through the swimming pool plane opposite to the previous direction of automatic pivot of the base member.

6 Claims, 5 Drawing Sheets

(56) References Cited

U.S. PATENT DOCUMENTS 5,223,135 A * 6/1993 MacPhee .................. E04H 4/16
210/242.1
2015/0101116 A1* 4/2015 Stien ....................... E04H 4/101
4/498

* cited by examiner

POOL COVER SKIMMER ATTACHMENT

CROSS-REFERENCE TO RELATED APPLICATIONS

This application claims the benefit under 35 U.S.C. § 119(e) of U.S. Patent Application No. 62/444,539, filed Jan. 10, 2017, which is incorporated herein by reference in its entirety.

TECHNICAL FIELD

This novel technology relates generally to the field of mechanical devices. More specifically, the present technology is in the technical field of swimming pool maintenance accessories.

BACKGROUND

While swimming pools are great to have, owners engage in constant pool maintenance, part of which is the need to constantly clean their swimming pools. While some maintenance procedures, such as disinfecting the water, can be accomplished with simple tablet dosing, larger detritus (such as leaves) in the pool usually requires the pool owner to manually skim the pool with a cumbersome skimming net or to hire a service to do the same, either way costing the owner a great deal of time and expense. Further, while some detritus may sink to the bottom of the pool and into the realm of a submersible pool cleaning device, failure to frequently and thoroughly remove the debris may lead to damage to the pool's filters and/or pump mechanisms. And, in the case that the debris simply remains on the surface of the water, skimmer baskets can become quickly overloaded, again requiring frequent maintenance to avoid filtering complications.

Thus, there remains a need for a better way to efficiently remove physical detritus from swimming pools and alleviate maintenance issues. The present novel technology addresses these needs.

Like reference numbers and designations in the various drawings indicate like elements. The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not occur, and that the description includes instances where said event or circumstance occurs and instances where it does not.

FIGS. 1-5 depict various aspects of the present novel technology, an automatic pool top skimmer system 100 engaged upon opening and/or closing of a swimming pool cover. Skimmer system 100 (also referred to as attachment and/or apparatus) typically includes skimming element 105, skimming element holder(s) 110, pivotable base member 120, fastening member(s) 130, pool cover 140, pool cover leading member 145, tensioning member 146, and/or skimmer guide 148.

Skimmer system 100 typically may be pivotably connected to pool cover 140. Skimming element 105 typically may be an elongated mesh-like fabric member or length that freely passes water but engages solid matter over a given mesh size, and is more typically positioned to skim the first several inches of water at a pool surface. Skimming element 105 typically is resistant to known degradative aspects of the outdoor- and pool-specific environment (e.g., chlorine, ultraviolet radiation, and/or the like). Such materials are known in the art. Skimming element 105 typically is operationally connected, more typically in a repeatedly removable and reattachable manner, to one or more skimming element holders 110 (which may also be referred to as elongated rods, first elongated rod, second elongated rod, and the like) operationally connected to pool cover 140. For example, skimming element 105 may be configured with pocket(s) 115 and/or the like on one or both ends on opposing sides of the pool surface and perpendicular to pool cover 140, and holders 110 may be one or more metal, plastic, and/or similarly rigidly suited rods, threaded fasteners, hook-and-loop fabrics, suction members, and/or the like configured to fasten to skimming element 105, such as via pockets 115. Holders 110 typically retain skimming element 105 relative to pool cover 140 leading member 145 during movement of pool cover 140 over the pool surface, while also allowing for easy removal of skimming element 105 for cleaning, storage, replacement, and/or the like. In some implementations, holders 110 may define a bracket to hold elongated net 105.

Holders 110 typically operationally connect (e.g., via fasteners, weldments, adhesives, threading, retainer grooves, and/or the like) in turn to base member 120. Base member 120 typically may be a substantially horizontal rod operationally connected to pool cover 140, typically to leading member 145 via one or more fastening members 130, and traversing in a typically parallel configuration across the surface of the pool between oppositely disposed pool walls 310. Fastening members 130 typically connect base member 120 to pool cover 140 and/or pool cover leading member 145 in a removable manner. For example, fastening members 130 may be compressive bands, crimped loops, weldments, adhesives, and/or other known fastening mechanisms.

During operation, base member 120 may typically pivot about one or more skimmer guide 148 (which may also be referred to as bearing, follower, cam follower, and the like) disposed at one or more pool walls 310 and/or guide members 150 (which may also be referred to as railing, race, tracking, elongated track, and/or the like) components, allowing skimmer 100 to pivot into and out of pool surface, typically about the axis defined by base member 120. Further, in some embodiments, tensioning member 146 may bias skimmer apparatus 100 in a preferred position, typically either towards or away from the pull of gravity, to allow guide 148 to travel through guide railing 150 tracks and enable actuation and deactuation of skimmer 100 into and out of the surface of the pool.

Figure 3:
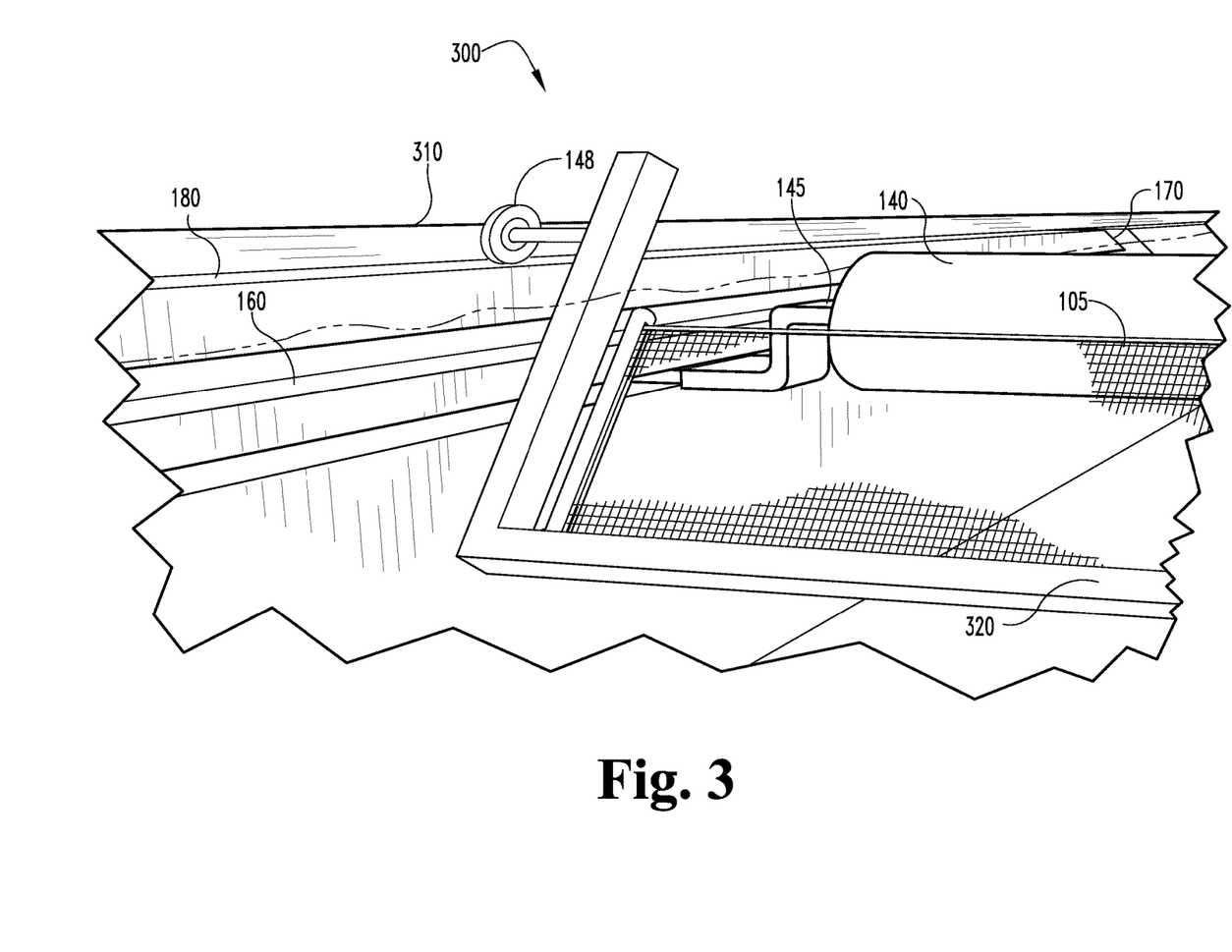
FIG. 3 depicts a third perspective view of the skimmer attachment of FIG. 1 in a first example installation on a pool.

Skimmer 100 typically may interface, as shown in FIG. 3 pool installation embodiment 300, with one or more swimming pool walls 310 via respective guide members 150, each of which typically extends along the major axis 200 of pool cover 140 and pool wall 310. Railing 150 typically includes lower/first guide member 160, inclination member/first transition element 170, upper/second guide member 180, upper/first member stop 185, declination member/second transition element 190, and/or lower/second member stop 195. Guide member 150 components typically are connected via mechanical and/or chemical attachment, such as via weldments, interference fitment, adhesives, fasteners, and/or the like. For example, lower member 160 may connect at one end to a first end of declination member 190 and at the other end to a first end of inclination member 170 via weldments, and upper member 180 may be positioned above, and parallel to, lower member 160 and also similarly connect at a second end to declination member 190 and at the other end to a second end of inclination member 170 via adhesive.

Figure 1:
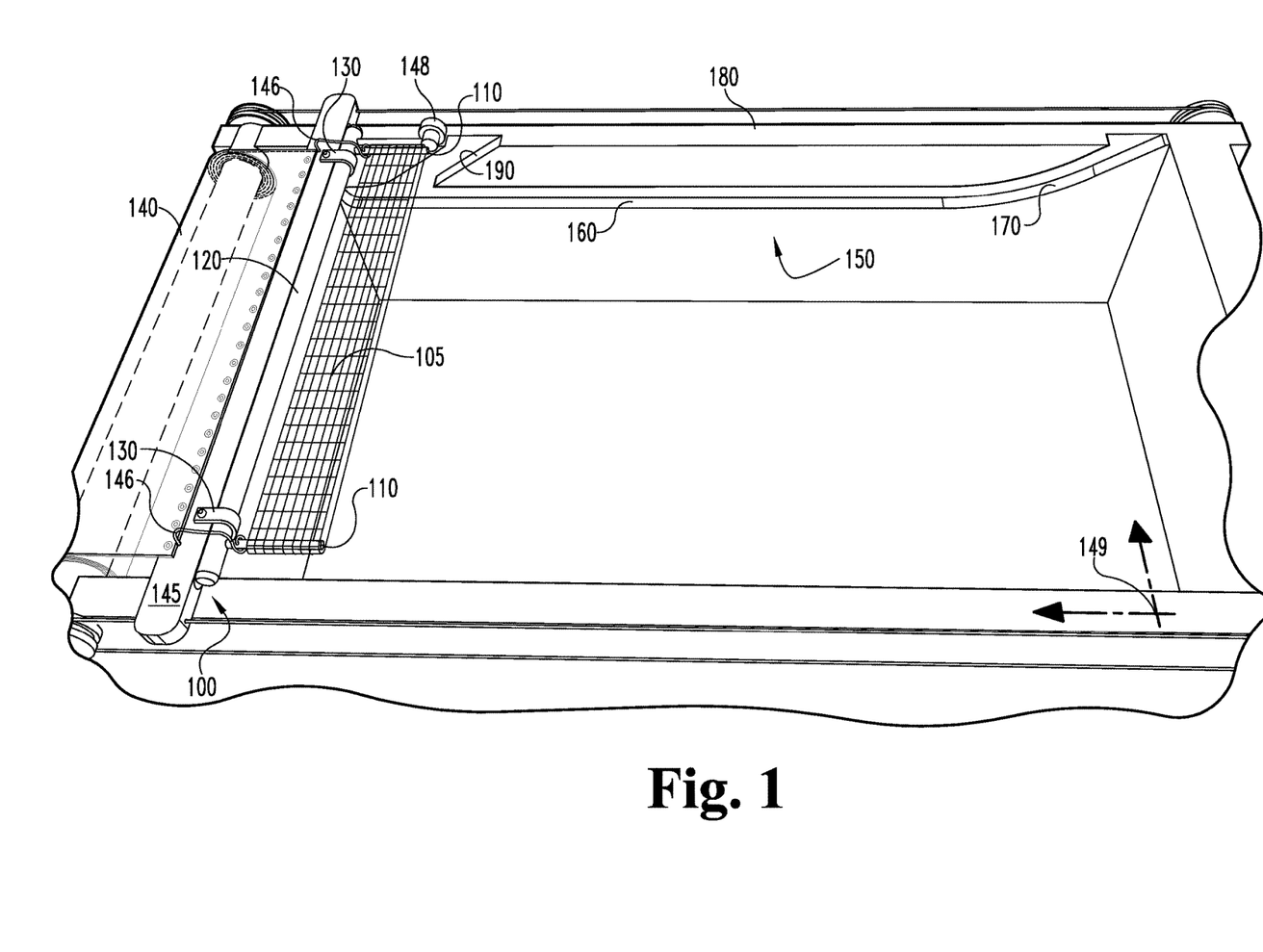
FIG. 1 depicts a first perspective view of the present novel skimmer attachment.
Figure 2:
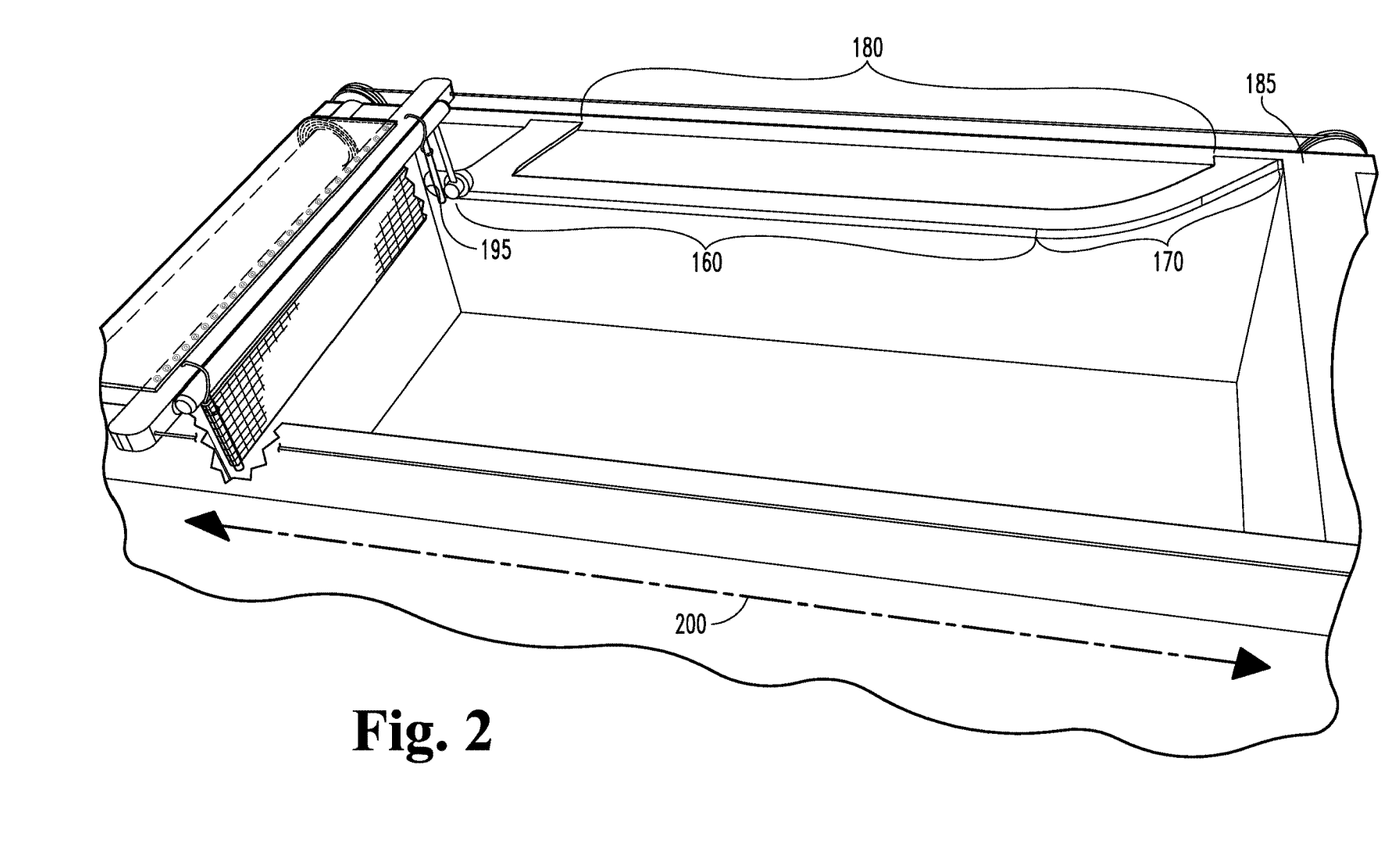
FIG. 2 depicts a second perspective view of the skimmer attachment of FIG. 1.
Figure 4:
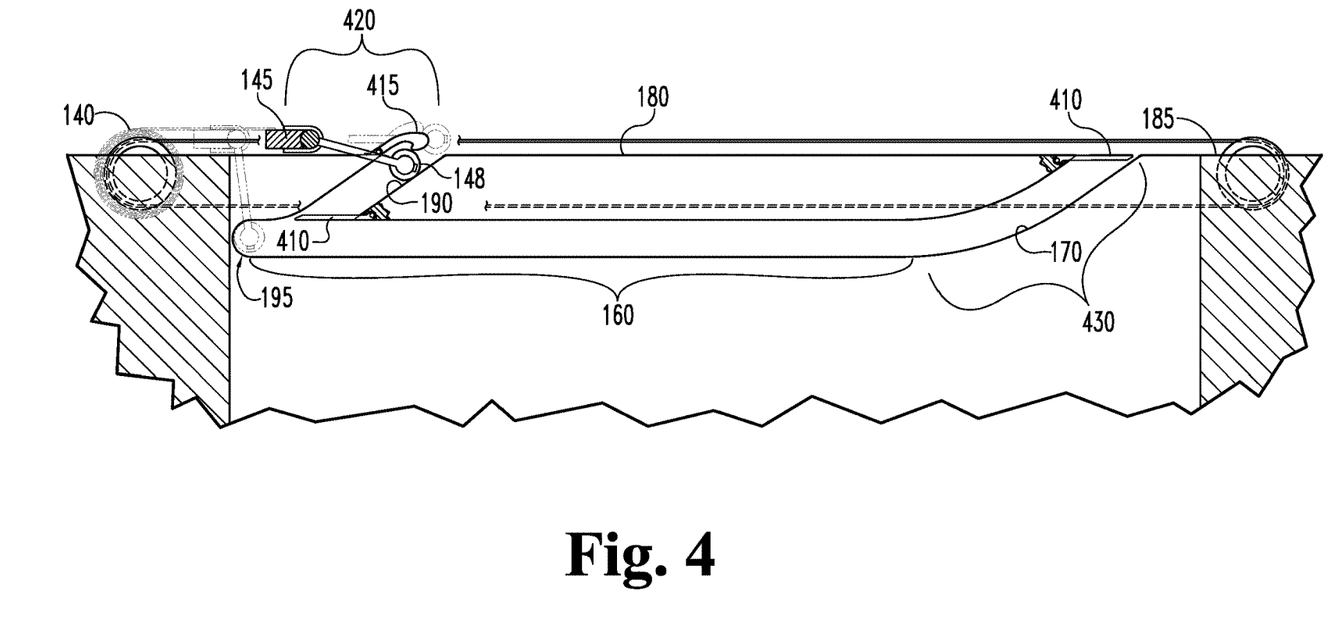
FIG. 4 depicts a fourth perspective view of the skimmer attachment of FIG. 1 in the first example installation of FIG. 3, depicting various stages of skimmer operation.

During operation of skimmer 100 (typically depicted in diagrammatic staging view 400), skimmer guide 148 typically may engage guide member 150, with guide 148 rolling and/or otherwise moving along members 150. Tensioning member 146, as depicted in FIGS. 1 and 2, typically may bias skimmer system 100 towards the surface of the pool (i.e., in a first direction), the surface of the pool typically defining a pool surface plane 149, such that skimmer attachment 100 skims through the surface water during closure of pool cover 140 and guide 148 runs along lower guide member 160. Near the end of the length of the major axis 200 of the pool, guide 148 follows inclination member 170 upwards towards upper guide member 180 (FIG. 4 depicts this stage as 'skimmer rises up to upper guide member' 430 where the travel is in a second, opposite direction), eventually coming to a stop on upper guide member 180 at upper member stop 185, which typically is flat, but in other implementations may be shaped to more securely retain guide 148. During this inclination, skimmer 100 correspondingly pivots upwards and out from the pool, straining with it pool surface debris.

When pool cover 140 retracts, guide 148 typically diverts over inclination member 170, typically by way of a diverting structure 415 on the track biasing guide 148's motion, the tension exerted by tensioning member, a trap door 410 (allowing guide 148 to unidirectionally pass through first transition 170 and/or second transition 180), and/or other mechanisms diverting guide 148 to remain on upper member 180 rather than travelling down inclination ramp 170. Guide 148 then rides along upper guide member 180, with skimmer element 105 correspondingly positioned above the pool water surface, until arriving at declination ramp 190. Guide 148 then travels down declination ramp 190, this time typically using diverting structure 415 on the track biasing guide 148's motion, the tension exerted by tensioning member, trap door 410, and/or other mechanisms to divert guide 148 down declination ramp 190 rather than to remain on upper member 180. FIG. 4 depicts this stage as 'skimmer drops down to lower guide member' 420. Skimming element 105 at this point correspondingly pivots into the surface of the pool, and guide 148 then typically comes to a rest at lower member stop 195.

In other embodiments, guide members 150 may be altered and/or reconfigured to change skimmer 100 pivot points, actuation points, and/or the like. For example, oppositely biasing tensioning member 146 and modifying track (e.g., via lippage direction), would allow skimmer 100 to begin at lower member stop 195, rise out of the water by running along second transition 190, ride along upper member 180, rest at upper guide member stop 185, catch on lippage to travel down first transition 170, ride along lower member 160, and again return to lower member stop 195. Thus, through this configuration, skimmer 100 may pivot out of the water when closing the pool cover 140 and then pivot into the water (thus skimming the surface) upon closing the cover 140. Accordingly, nonlimiting example configurations may include skimming while opening the pool cover 140; skimming while closing the pool cover 140; skimming while opening and closing pool cover 140; retaining guide 148 at upper member stop 185 while cover 140 is closed; retaining guide 148 at lower member stop 195 while cover 140 is closed; retracting skimmer 100 at middle of pool; retracting skim 100 using combined, X-shaped transition; skimmer 100 actuates into pool surface to skim during both directions of travel and then actuates up at each end; and/or the like.

FIG. 3 typically depicts skimmer 100 in an example swimming pool installation embodiment 300, wherein skimmer 100 interfaces with pool wall 310, while skimmer element 105 is actuated to engage pool surface and guide 148 rides along upper race 180. In some implementations, as depicted in FIG. 3, horizontal cross member 320 may be oppositely disposed from pivotable base member 120 and be operationally connected to skimming element 105 (either independently or attached to skimming element holders 110 typically) at the inserted side of skimmer 100. Cross member 320 may, for example, add rigidity to skimming element 105, be weighted to bias skimmer 100 or more effectively travel through water, more evenly travel in tracking 150, and/or the like.

FIG. 4 typically depicts the various stages of operation of skimmer system 100 in one example embodiment in diagrammatic staging view 400. For example, similar to discussed above, skimmer 100 and guide 148 begins at declination member 190 and enters 'skimmer drops down to lower guide member' (or 'water engaging) 420 stage. Skimming element 105 at this point typically enters the pool surface and skims the water. Then, skimmer 100 and guide 148 travels along lower race 160 before entering 'skimmer rises up to upper guide member' (or 'water engaging) 430 stage. Skimmer 100 and guide 148 then travel up inclination member 170, raising skimming element 105 from water and into the air. Skimmer 100 and guide 148 may then travel back toward the origin point before being reengaged to travel again through stage 420. In other embodiments, as described above, such stages may be reversed and/or modified to alter actuation points, biases, and/or the like.

In some embodiments, guide 148 may lift up and pass a one-way trap door 410, which allows skimmer 100 and guide 148 to exit from lower guide member 160 and not again return to lower guide member 170 (but instead skip over inclination member 170) and travel along upper guide member 180. Such trap doors 410 may be tensioned, sprung, weighted, and/or otherwise biased to typically allow one-directional transport between guide member 150 components. In further embodiments, some or all system 100 components may be a kit and/or kits.

In a further embodiment, typically for use with irregularly shaped pools (e.g., oval, kidney bean, circle, triangular, and/or the like) where a straight tracking system might not be appropriate (e.g., where pool cover may ride on top of the concrete/cement surface and overlap thereon), system 100 may be configured as a drop-down, compression member assembly. Such compression member system may, for example, attach to the leading edge 145 of pool cover 140 and actuate into the pool surface upon while the pool cover 140 traverses the pool. Compression-type poles may then operationally connect to, and extend from, system 100 components (e.g., skimming element 105, element holders 110, base member 120, cross member 320, and/or the like) and/or in some cases attached to leading edge 145 itself, and then compressively interface with pool wall 310.

As the system 100 traverses over the irregularly shaped surface, the compression members would compress and/or extend, depending on whether the pool is narrowing or widening. Skimming element 105 may then slacken and/or stretch to accommodate the difference in width, while still skimming the pool surface and retaining the previously skimmed debris. In another embodiment, one or more skimming element 105 reservoirs may hold a tensioned, surge capacity length of netting 105, such that as the pool width widens the reservoir may feed additional elongated netting 105 to account for the width of the pool while keeping the elongated netting sufficiently taut. As the pool width decreases, netting 105 may respool into the reservoir (e.g., using springs, motors, etc.) to maintain netting 105 as sufficiently taut. In further embodiments, compression members may have ends that roll, glide, interface with a race/track, and/or the like to further guide system 100.

Skimmer apparatus 100 may be used in conjunction with, for example, a method for skimming the surface of a pool. Such method may, for example, include steps such as: upon initiating operation of the swimming pool cover, automatically pivoting an elongated skimmer into the pool surface ahead of the leading edge of the swimming pool cover; skimming debris from the surface of the swimming pool as the cover traverses the swimming pool; and immediately before leading edge comes to rest, pivoting the elongated skimmer out of the water. Further implementations may include the step of after the leading edge comes to rest, emptying the skimmer; replacing the emptied skimmer, where the automatically pivoting step occurs as the elongated skimmer transitions between two races attached to the side of the pool, and/or the like.

Another method example embodiment may include steps such as: moving the swimming pool cover over the swimming pool; automatically pivoting an elongated skimmer into the pool; and collecting floating debris with the elongated skimmer. Further implementations may include steps of automatically pivoting the elongated skimmer out of the pool, emptying the skimmer, replacing the emptied skimmer, and/or where the automatically pivoting step occurs as the elongated skimmer transitions between two members attached to the side of the pool.

Figure 5:
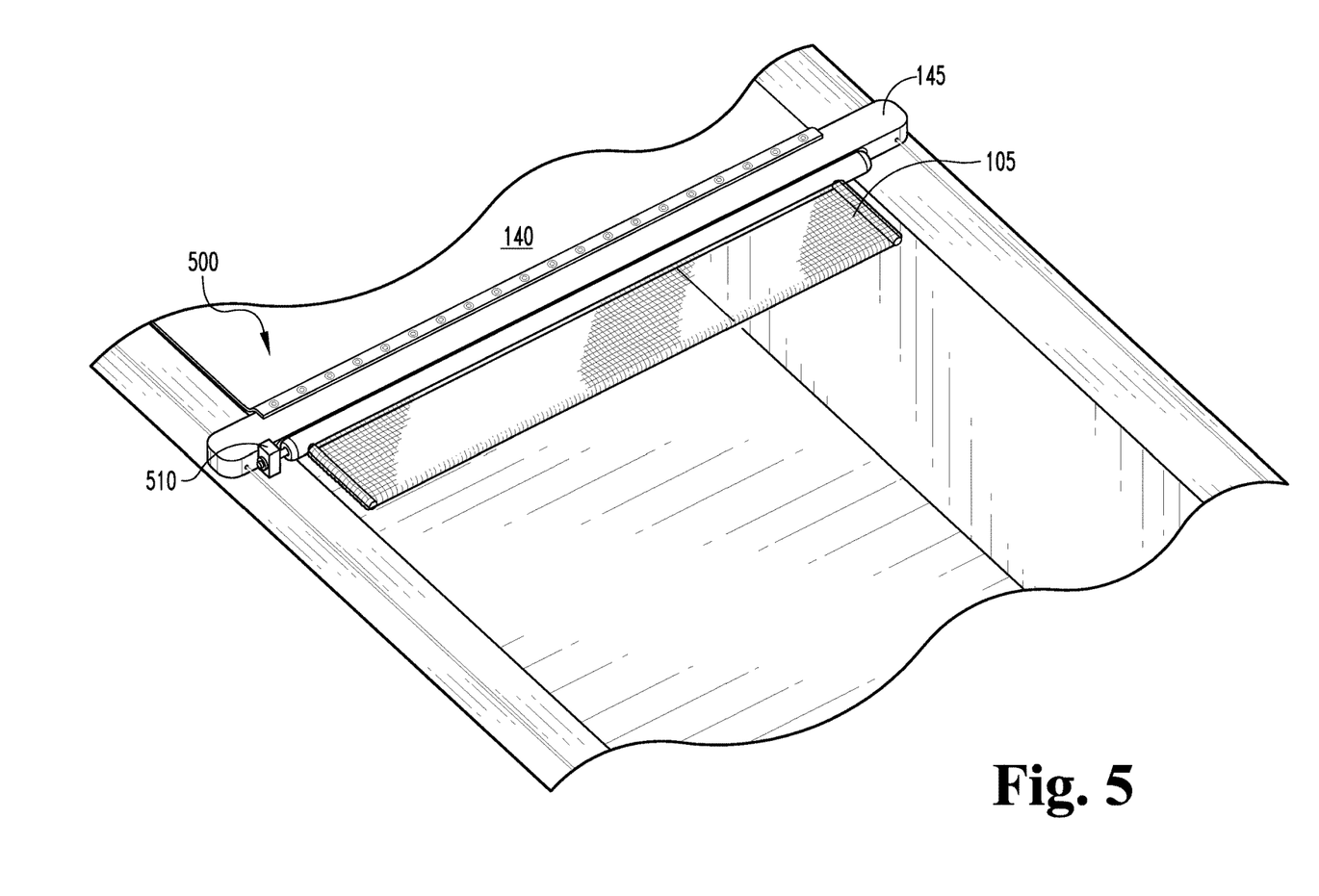
FIG. 5 depicts an alternative, actuated embodiment of the skimmer attachment.

FIG. 5 depicts an alternative embodiment, actuated embodiment 500 of skimmer 100 that typically substitutes skimmer guide 148 and guide members 150 for an actuating member 510. Actuating member 510 typically is an electronically controllable actuator (e.g., a rotary actuator such as a stepper motor, servomotor, etc., but other actuator may be similarly used) that is operationally connected to leading edge 145 (e.g., via straps, weldments, fasteners, adhesives, etc.). Actuating member 510, upon energization, then may pivot net 105, holders 110, and/or base member 120 into and out of the surface water.

Such embodiment 500 may, for example, eliminate the need for guide 148, guide members 150, and/or the like by simplifying skimmer 100. In some instances, actuating embodiment 500 may allow pivoting before moving leading edge 145, at any point during movement along the major axis 200, and/or the like. Thus, for example, actuated embodiment 500 may allow a pool owner to program precisely when to actuate into and out of the pool surface, in what pivoted position to be at rest, and/or the like. Such embodiment 500 may similarly allow operation in an irregularly shaped swimming pool by energizing the actuating member 510 to pivot skimmer 100 into the surface when the pool dimensions can accommodate skimmer 100, as well as pivoting skimmer 100 from the surface when the pool dimensions cannot accommodate skimmer 100 (e.g., due to narrowing and/or the like). Still further embodiments may use two or more actuating members 510 along the length of the elongated skimmer 100 and/or preferentially (and/or partially) actuate the one or more actuating members 510. For example, where three equally spaced actuating members 510 are connected to skimmer 100 and the pool narrows in the middle (e.g., in a kidney-shaped swimming pool), the two outside actuating members 510 may raise their portions of the skimmer 100 above the level of the pool wall while the middle actuator 510 remains in the surface of the swimming pool.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. An automatic skimmer system for a swimming pool cover for cleaning the surface of a swimming pool, comprising:
   a skimming element holder;
   an elongated skimming element operationally connected to the skimming element holder;
   an elongated base member operationally connected to the swimming pool cover and to the skimming element holder, wherein the elongated base member is oriented substantially perpendicular to the skimming element holder and wherein pivot of the elongated base member also pivots the skimming element holder and the skimming element;

a skimmer guide operationally connected to the elongated base member; and a guide assembly engaged by the skimmer guide, wherein the guide assembly further comprises:
  a first guide member;
  a second guide member oriented parallel to the first guide member;
  a first transition element connecting the first guide member and the second guide member; and
  a second transition element connecting the first guide member and the second guide member and spaced from the first transition element;

wherein the connected first guide member, first transition element, second guide member, and second transition element define a race circuit for guiding the movement of the skimmer guide;

wherein the surface defines a swimming pool plane;

wherein the elongated base member is adapted to automatically pivot to move the skimming element through the swimming pool plane and in a first direction to engage a surface substantially parallel to the swimming pool plane when the swimming pool cover moves thereover;

wherein the elongated base member is adapted to automatically pivot in a second, opposite direction to disengage the surface before the elongated base member ends traversal along the swimming pool plane;

wherein the first transition element extends between the first guide member and the second guide member at an angle inverse from the angle that the second transition element transitions between the first guide member and the second guide member;

wherein the skimmer guide engages the guide assembly for moving along the race circuit defined by the first guide member, the first transition element, the second guide member, and the second transition element.

2. The skimmer system of claim 1, wherein the first transition element actuates the skimming element through the swimming pool plane.

3. The skimmer system of claim 2, wherein the second transition element actuates the skimming element through the swimming pool plane in a direction opposite from the actuation of the skimming element caused by the first transition element.

4. The skimmer system of claim 1, further comprising at least one trap door operationally connected in the circuit between the first guide member and the first transition element and separating the first guide member and the second guide member, allowing the skimmer guide to pass from the first guide member through the first transition element to the second guide member, and preventing the skimmer guide from passing from the second guide member through the first transition element and to the first guide member.

5. A pool skimming apparatus for cleaning the surface of a swimming pool having a leading edge, comprising:
  an elongated track oriented parallel to a major axis of a swimming pool cover;
  an extendable swimming pool cover deployable from a front end of the swimming pool along the major axis to an opposite, rear end of the swimming pool;
  a first elongated rod operationally connected to the elongated track and operationally connected to a front edge of a swimming pool cover;
  a second elongated rod connected to the first elongated rod, wherein the second elongated rod is oriented perpendicularly to the first elongated rod and wherein the first and second elongated rods define a bracket;
  a cam follower operationally connected to the elongated bracket; and
  a net operationally connected to the elongated bracket;
wherein the surface defines a swimming pool plane;
wherein moving the leading edge from a first position to a second position over the pool automatically pivots the bracket and net into an orientation perpendicular to the swimming pool plane to engage the surface with the net;
wherein as the leading edge reaches the opposite end, the bracket and net automatically pivot into an orientation parallel to the swimming pool plane to disengage the net from the surface; and
wherein the elongated track further comprises:
  a first guide member operationally connected to a swimming pool wall and extending along a major axis of the swimming pool wall and positioned below the surface;
  a second guide member operationally connected to a swimming pool wall, positioned above the surface, and running parallel to the first guide member;
  a first transition element disposed at one end of the first guide member and operationally connected thereto and connected to the same end of the second guide member; and
  a second transition element disposed at an end of the first guide member and the second guide member opposite from the first transition element, connecting the corresponding ends of the first guide member and the second guide member.

6. The pool skimming apparatus of claim 5, further comprising at least one trap door operationally connected at the intersection of the first guide member and a transition member and separating the first guide member and the second guide member; wherein the trap door may be opened to allow transition of the cam follower from the first guide member to the second guide member, but preventing transition of the cam follower from the second guide member to the first guide member.

* * * * *